Jan. 12, 1943.　　E. R. GREENBAUM　　2,308,447
CUTTING TOOL
Filed March 9, 1942

INVENTOR
Everett R. Greenbaum
BY
Bean, Brooks, Buckley & Bean
ATTORNEYS

Patented Jan. 12, 1943

2,308,447

UNITED STATES PATENT OFFICE 2,308,447

CUTTING TOOL

Everett R. Greenbaum, Buffalo, N. Y., assignor of one-fourth to Leonard Finkelstein and one-fourth to Paul Zackheim, both of Buffalo, N. Y.

Application March 9, 1942, Serial No. 433,859

4 Claims. (Cl. 77—73.5)

The present invention relates to tools and has particular relation to countersinking, counterboring and like tools of the type which are adjustable to provide cuts of varying depth.

In countersinking tools, for example those used for countersinking recesses for the reception of the heads of rivets, screws or the like, it is frequently necessary to have the depths of the recesses correspond accurately to the heights of the heads. In practice the adjustment of the cutting tools to obtain this result has been accomplished by the method of trial and error, or by adjusting the tool with the aid of a gauge set according to the specified or measured height of the head.

According to the present invention the adjustment is made directly from the head of the rivet or screw itself, expediting the adjustment operation, and obviating the use of a gauge and any errors or inaccuracies resulting from the use thereof; or, likewise, obviating the waste of time and materials resulting from use of the trial and error method.

These and other objects and advantages of the present invention will become apparent from the following description of the invention as applied to a countersinking tool illustrated in the accompanying drawing, wherein.

Figure 2:
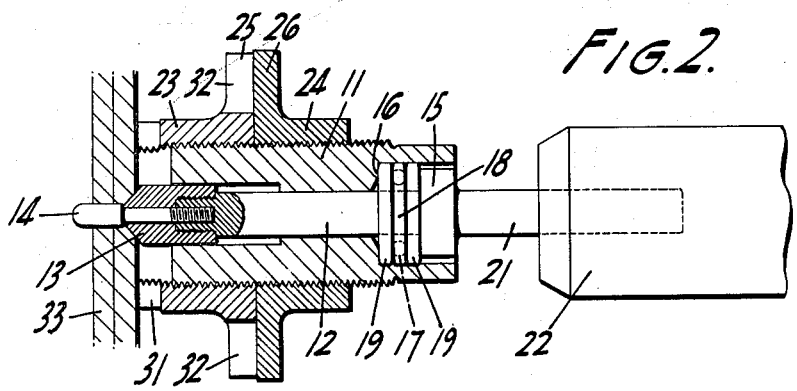
Fig. 2 is a central longitudinal sectional view through the device upon conclusion of the operation of a countersinking operation; and, Fig. 3 is an end view thereof.

As shown in the drawing the tool includes a tubular body 11 providing a bearing for a cutter spindle 12 upon the forward end of which is secured a countersink cutter head 13 of angularity corresponding to that of the countersink recess to be cut. The cutter head 13 may be provided with a pilot, and in the drawing a detachable pilot 14 is illustrated, this enabling the same cutter head 13 to be used for countersinking openings of different diameters, by substituting pilots of corresponding diameters.

The spindle is provided with an annular shoulder 15 for limiting movement of spindle and cutter assembly relative to the body 11, toward the left as viewed in Fig. 2; and, if desired, an anti-friction thrust bearing may be interposed between this shoulder and the end wall 16 of the body. Such a bearing may comprise balls 17 held by a retainer 18 and rolling upon opposed ball race members 19. The projecting shank 21 of the spindle is adapted to be received in a chuck 22 upon the drive shaft of a suitable motor, not shown.

To the exterior of body 11 are screw threaded sleeves 23 and 24 provided with flanges 25 and 26 having flat adjacent faces disposed in a plane normal to the axis of rotation of the cutter and adapted for abutment as shown in Fig. 2. External surface portions 27, 28 and 29 respectively of sleeve 23, sleeve 24 and body 11, may be knurled to enable a person using the tool to grasp and turn these parts easily. Recesses 31 may be formed in the sleeve 23 to enable cuttings from a work piece to discharge from the space immediately around the cutter head 13.

According to the invention recesses 32 are formed in at least one of the sleeves 23, 24 to receive the shanks of rivets or screws, with such shanks extending parallel to the axis of rotation of the cutter assembly. Any desired number of such recesses 32 may be employed, and in the illustrated device eight of them are shown formed in the flange 25 of sleeve 23, their widths varying so as to accommodate snugly the shanks of rivets or screws of different diameters.

Figure 1:
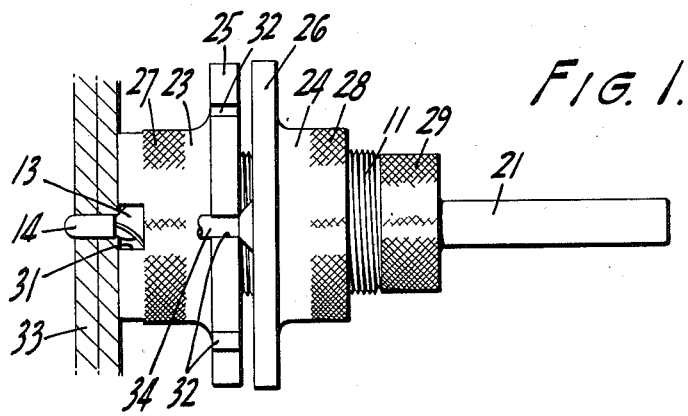
Fig. 1 is a side elevation of the tool in the process of adjustment, a work piece adjacent the tool appearing in section.
Figure 3:
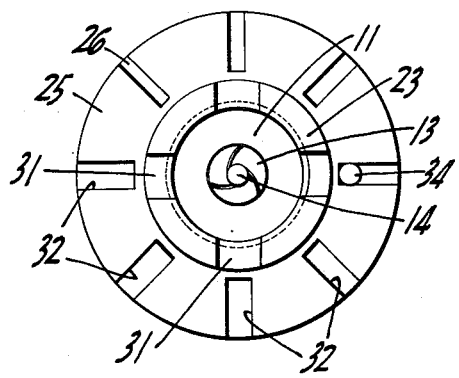

In using the tool to countersink openings of a given size in a work piece 33, the sleeves 23 and 24 are backed off, or screwed to the right of the body 11 as the parts appear in Figs. 1 and 2, to permit the pilot 14 to enter an opening in the work piece and the cutter 13 to contact the edge of such opening. With the cutter held in this position, the sleeve 23 is turned until it contacts the face of the work piece, as shown in Fig. 1. This operation will move the body away from the work piece until the limit position thereof relative to the cutter spindle is reached, this being determined by the shoulder 15 and end wall 16.

A rivet 34 or a screw, of the size to be employed, is now inserted in the recess 32 which fits its shank, and the sleeve 24 is screwed forwardly until its flat forward face is against the head of the rivet, this being the condition shown in Fig. 1. If desired, the tool may be removed from the work piece to perform this latter operation, but with care being taken that the sleeve 23 does not move relative to the body 11.

Now, holding the sleeve 24 and body 11 against relative motion, the sleeve 23 is turned to free the rivet 34, and the latter is removed. Then, still holding parts 24 and 11 against relative motion, the sleeve 23 is turned against the sleeve 24, locking the sleeve and body assembly. This condition of the three parts 11, 23 and 24 is shown in Fig. 2.

The tool is now adjusted so that it will countersink to the proper depth to receive the rivet head, and it may now be used in the usual manner, the shank 21 being connected to the chuck 22 of the drive motor. In the cutting operation the unit comprising sleeves 23 and 24 and body element 11, which are now locked together, may be grasped with one hand and held against the work piece with pilot 14 in the opening to be countersunk, and cutting pressure may be applied with the other hand upon the motor. Cutting can proceed only until the shoulder 15 abuts the thrust bearing which in turn is abutted against end wall 16 of the body 11. This is the condition shown in Fig. 2, wherein the work piece has been countersunk to the proper depth to receive the head of rivet 34. During the cutting operation the removed portions of the work piece may discharge through recesses 31, thereby preventing the cutter from becoming clogged.

It will be understood that the invention is applicable to counterboring and similar operations where proper depth of cut is required, as well as to countersinking operations, and that in all such cases it provides a rapid and simple means for effecting the proper adjustment of a cutting tool directly from a headed member to be inserted in the recess which is to be cut.

It will be understood further that the tool and the parts thereof shown and described herein are merely illustrative of one form which the invention may assume, and that the principles involved may be otherwise embodied without departing from the spirit of the invention or the scope of the appended claims.

What is claimed is:

1. In a tool for cutting recesses for receiving the heads of fasteners or like parts having shanks, a body element, a rotatable cutter having limited axial motion relative to said element, a work piece engaging member and another member each adjustable upon said body element parallel to the axis of rotation of the cutter, said members having face portions normal to said axis and adapted to receive therebetween the head of such a part, one of said members having at least one recess for receiving the shank of such part in parallel relation to said axis and with the head of the part between and in full engagement with said face portions, and said face portions being adapted to be brought into abutment upon removal of said part by adjustment of said work piece engaging member.

2. In a tool for cutting recesses for receiving the heads of rivets or like parts having shanks, a body element, a rotatable cutter having limited axial motion relative to said element, a work piece engaging member and another member each screw threaded upon said body element for adjustment thereupon in the direction of the axis of rotation of the cutter, said members having face portions normal to said axis and adapted to receive therebetween the head of such a part, one of said members having at least one recess for receiving the shank of such part in parallel relation to said axis when the head is between and in full engagement with said face portions, and said face portions being adapted to be brought into abutment upon removal of said part by screw adjustment of said work piece engaging members.

3. In a tool for cutting recesses for the heads of rivets or like parts having shanks, a body element, a rotatable cutter journaled in said body for rotation and limited relative axial motion, a work piece engaging member and another member each screw threaded upon said body element for adjustment thereupon in the direction of the axis of rotation of the cutter, said members having face portions normal to said axis and adapted to receive therebetween the head of such a part, one of said members having at least one recess for receiving the shank of such part in parallel relation to said axis when the head is between and in full engagement with said face portions, and said face portions being adapted to be brought into abutment upon removal of said part by screw adjustment of said workpiece engaging member.

4. In a tool for cutting recesses for the heads of rivets or like parts having shanks, a body element, a rotatable cutter journaled in said body for rotation and limited relative axial motion, a work piece engaging member and another member each screw threaded upon said body element for adjustment thereupon in the direction of the axis of rotation of the cutter, said members having face portions normal to said axis and adapted for abutment to lock said members relative to said body element, one of said members having a plurality of recesses formed therein, each of said recesses being adapted to receive the shank of such a part in parallel relation to said axis and with the head of the part received between and in full engagement with said face portions of the members whereby the latter are separated by the thickness of said head, and said recesses being of different widths to accommodate shanks of different diameters, said face portions being lockable in abutment by screw adjustment of said work piece engaging member subsequent to removal of said part from a recess corresponding to its diameter.

EVERETT R. GREENBAUM.